(12) United States Patent
Mysore et al.

(10) Patent No.: US 9,774,393 B2
(45) Date of Patent: Sep. 26, 2017

(54) OPTICAL CROSS-BAR SWITCH THAT PROVIDES STABLE, LOW-LOSS, FIBER-OPTIC PATH PROTECTION

(71) Applicant: Aurora Networks, Inc., San Jose, CA (US)

(72) Inventors: Sudhesh Mysore, Carlsbad, CA (US); Krzysztof Pradzynski, Santa Clara, CA (US)

(73) Assignee: Aurora Networks, Inc., San Jose, CA (US)

( * ) Notice: Subject to any disclaimer, the term of this patent is extended or adjusted under 35 U.S.C. 154(b) by 0 days.

(21) Appl. No.: 15/046,410

(22) Filed: Feb. 17, 2016

(65) Prior Publication Data

US 2016/0241337 A1    Aug. 18, 2016

Related U.S. Application Data

(60) Provisional application No. 62/117,083, filed on Feb. 17, 2015.

(51) Int. Cl.
*H04B 10/08* (2006.01)
*H04B 10/079* (2013.01)
(Continued)

(52) U.S. Cl.
CPC ....... *H04B 10/0795* (2013.01); *H04B 10/032* (2013.01); *H04J 14/0294* (2013.01); *H04Q 11/0005* (2013.01); *H04Q 2011/0043* (2013.01)

(58) Field of Classification Search
CPC .............. H04B 10/0795; H04B 10/032; H04B 10/0793; H04B 10/07955; H04J 14/0294; H04Q 11/0005; H04Q 2011/0043; H04Q 2011/0052; H04Q 2011/0058; H04Q 2011/0083
(Continued)

(56) References Cited

U.S. PATENT DOCUMENTS 5,589,970 A * 12/1996 Lyu ...................... H04B 10/572
                                                            398/14

* cited by examiner

*Primary Examiner* — M. R. Sedighian
(74) *Attorney, Agent, or Firm* — Thomas A. Ward

(57) ABSTRACT

A bidirectional optical fiber path includes a primary optical fiber path; a secondary optical fiber path coupled to the primary optical fiber path; an optical coupler coupled to both the primary optical fiber path and the secondary optical fiber path; an optical switch coupled to both the primary optical fiber path and the secondary optical fiber path, the optical switch selecting a path of lower optical loses; an optical cross-bar switch coupled to both the primary optical fiber path and the secondary optical fiber path and located between the optical coupler and the optical switch; a primary upstream light detector coupled to the primary optical path between the optical cross bar switch and the optical switch; a secondary upstream light detector coupled to the secondary optical path between the optical cross bar switch and the optical switch; a primary downstream light detector coupled to the primary optical path between the optical cross bar switch and the optical switch; a secondary downstream light detector coupled to the secondary optical path between the optical cross bar switch and the optical switch; and a stabilizing downstream light detector coupled to the primary optical fiber path between the optical coupler and the optical cross bar switch.

8 Claims, 5 Drawing Sheets

(51) Int. Cl.
*H04Q 11/00* (2006.01)
*H04B 10/032* (2013.01)
*H04J 14/02* (2006.01)

(58) Field of Classification Search
USPC .................. 398/9–38, 45, 50, 51, 54, 56
See application file for complete search history.

OPTICAL CROSS-BAR SWITCH THAT PROVIDES STABLE, LOW-LOSS, FIBER-OPTIC PATH PROTECTION

CROSS-REFERENCE TO RELATED APPLICATION

Referring to the application data sheet filed herewith, this application claims a benefit of priority under 35 U.S.C. 119(e) from provisional patent application U.S. Ser. No. 62/117,083, filed Feb. 17, 2015, the entire contents of which are hereby expressly incorporated herein by reference for all purposes.

BACKGROUND

Path protection is a technique employed in fiber-optic networks to protect against inevitable failures at the physical layer that might affect the services offered to end customers. This type of protection provides a way of maintaining service in spite of fiber cuts, dirty connectors, deteriorating optical losses or other degradations that cause the optical power level to drop below acceptable levels. A simple form of path protection is shown in FIG. 1.

In this scheme, a redundant "protection path" is provided in addition to the primary fiber path. A 50% optical coupler distributes the optical signal power equally into both paths, and a single-pole-double-throw (SPDT) optical switch is used to select the path with lower optical losses. Two photodiodes are used to measure the power in the two paths (IN1 and IN2 in FIG. 1) and switching decision are based on these power levels. The photodiodes are often incorporated within the body of the SPDT switch.

A serious disadvantage of this simple protection switching technique is that the 50% optical coupler results in an excess optical loss of 3 dB, reflecting the fact that half of the optical power (namely the power in the unused path) is wasted. It might seem that, in a bi-directional network where there are optical signals present in the reverse direction also, it might be possible to replace the 50% optical coupler in FIG. 1 with a second SPDT switch as shown in FIG. 2.

In this technique, there are two SPDT optical switches used so that the excess 3 dB loss of the 50% coupler is avoided. In order for the switch labeled as SPDT1 to make switching decision, there are also two photodiodes that are used to measure the optical power level in the upstream direction in the primary and protection paths (US1 and US2, respectively).

The major disadvantage of the protection technique shown in FIG. 2 is that using a cascade of two switches reduces loss but almost invariably results in instability that causes indefinitely long toggling of the switches from one state to another (even if the switches themselves are ideal with no chatter). Such rapid and long-lasting toggling of the optical switches can soon result in catastrophic failure of the switches.

A more stable protection switching technique where the first SPDT1 switch is replaced by a cross-bar (Xbar) switch is shown in FIG. 3.

The cross-bar switch is a 2×2 optical switch that has two states: (1) a BAR state in which inputs 1 and 2 are coupled directly to outputs 1 and 2, respectively, and (2) a CROSS state in which inputs 1 and 2 are coupled to outputs 2 and 1, respectively. FIG. 3 shows the cross-bar switch in a BAR state. An optical coupler is used to ensure that under normal conditions there is light propagating down both the primary and protection paths. The coupler can be asymmetric so that most of the light normally goes through the primary path. FIG. 3 shows the case where the optical coupler distributes the light in a 95% versus 5% split. The purpose of the cross-bar switch is to ensure that most of the downstream light goes though the path that has lower loss.

Since the coupler shown in FIG. 3 is not a 50% coupler, this protection technique has as much as 2.5 dB lower loss than the simple protection scheme shown in FIG. 1. This is a very important advantage of this protection technique.

SUMMARY

There is a need for the following embodiments of the present disclosure. Of course, the present disclosure is not limited to these embodiments.

According to an embodiment of the present disclosure, an apparatus comprises: a bidirectional optical fiber path including a primary optical fiber path; a secondary optical fiber path coupled to the primary optical fiber path; an optical coupler coupled to both the primary optical fiber path and the secondary optical fiber path; an optical switch coupled to both the primary optical fiber path and the secondary optical fiber path, the optical switch selecting a path of lower optical loses; an optical cross-bar switch coupled to both the primary optical fiber path and the secondary optical fiber path and located between the optical coupler and the optical switch; a primary upstream light detector coupled to the primary optical path between the optical cross bar switch and the optical switch; a secondary upstream light detector coupled to the secondary optical path between the optical cross bar switch and the optical switch; a primary downstream light detector coupled to the primary optical path between the optical cross bar switch and the optical switch; a secondary downstream light detector coupled to the secondary optical path between the optical cross bar switch and the optical switch; and a stabilizing downstream light detector coupled to the primary optical fiber path between the optical coupler and the optical cross bar switch.

According to another embodiment of the present disclosure, a method comprises: protecting a bidirectional optical fiber path including operating a primary optical fiber path; a secondary optical fiber path coupled to the primary optical fiber path; an optical coupler coupled to both the primary optical fiber path and the secondary optical fiber path; an optical switch coupled to both the primary optical fiber path and the secondary optical fiber path, the optical switch selecting a path of lower optical loses; an optical cross-bar switch coupled to both the primary optical fiber path and the secondary optical fiber path and located between the optical coupler and the optical switch; a primary upstream light detector coupled to the primary optical path between the optical cross bar switch and the optical switch; a secondary upstream light detector coupled to the secondary optical path between the optical cross bar switch and the optical switch; a primary downstream light detector coupled to the primary optical path between the optical cross bar switch and the optical switch; a secondary downstream light detector coupled to the secondary optical path between the optical cross bar switch and the optical switch; and a stabilizing downstream light detector coupled to the primary optical fiber path between the optical coupler and the optical cross bar switch.

These, and other, embodiments of the present disclosure will be better appreciated and understood when considered in conjunction with the following description and the accompanying drawings. It should be understood, however, that the following description, while indicating various embodiments of the present disclosure and numerous specific details thereof, is given for the purpose of illustration and does not imply limitation. Many substitutions, modifications, additions and/or rearrangements may be made within the scope of embodiments of the present disclosure, and embodiments of the present disclosure include all such substitutions, modifications, additions and/or rearrangements.

BRIEF DESCRIPTION OF THE DRAWINGS

The drawings accompanying and forming part of this specification are included to depict certain embodiments of the present disclosure. A clearer concept of the embodiments described in this application will be readily apparent by referring to the exemplary, and therefore nonlimiting, embodiments illustrated in the drawings (wherein identical reference numerals (if they occur in more than one view) designate the same elements). The described embodiments may be better understood by reference to one or more of these drawings in combination with the following description presented herein. It should be noted that the features illustrated in the drawings are not necessarily drawn to scale.

DETAILED DESCRIPTION

Embodiments presented in the present disclosure and the various features and advantageous details thereof are explained more fully with reference to the nonlimiting embodiments that are illustrated in the accompanying drawings and detailed in the following description. Descriptions of well-known materials, techniques, components and equipment are omitted so as not to unnecessarily obscure the embodiments of the present disclosure in detail. It should be understood, however, that the detailed description and the specific examples are given by way of illustration only and not by way of limitation. Various substitutions, modifications, additions and/or rearrangements within the scope of the underlying inventive concept will become apparent to those skilled in the art from this disclosure.

Switching Stability Analysis

Figure 2:
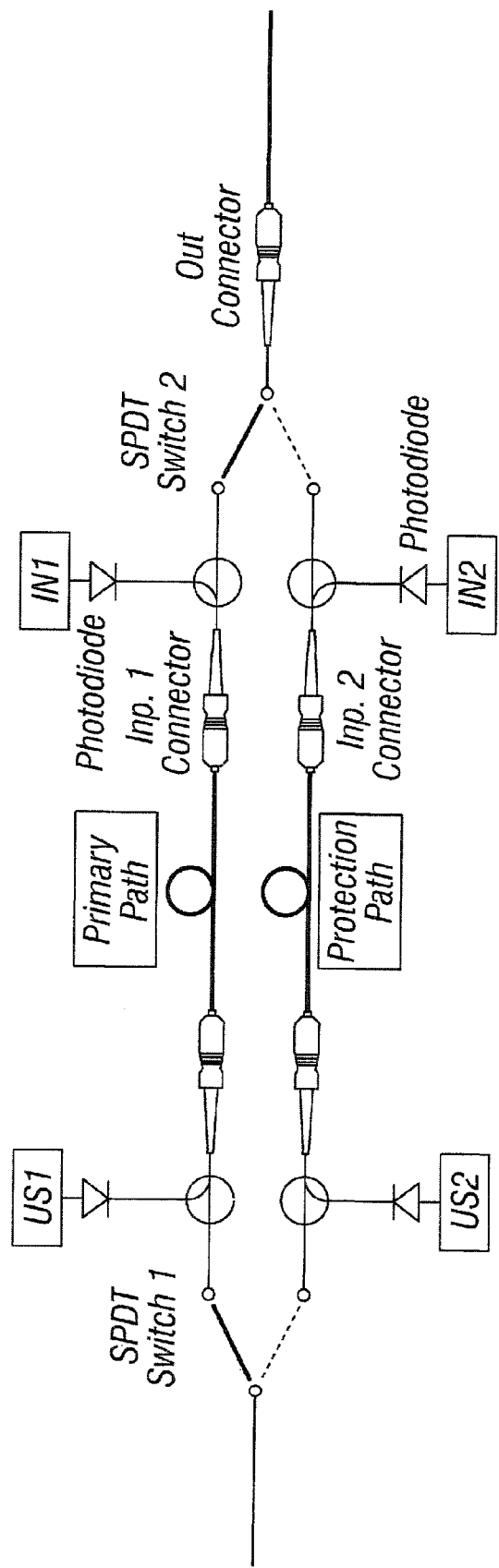
FIG. 2 illustrates a bi-directional path protection technique employing a primary and protection path, and two SPDT optical switches (appropriately labeled prior art).
Figure 3:
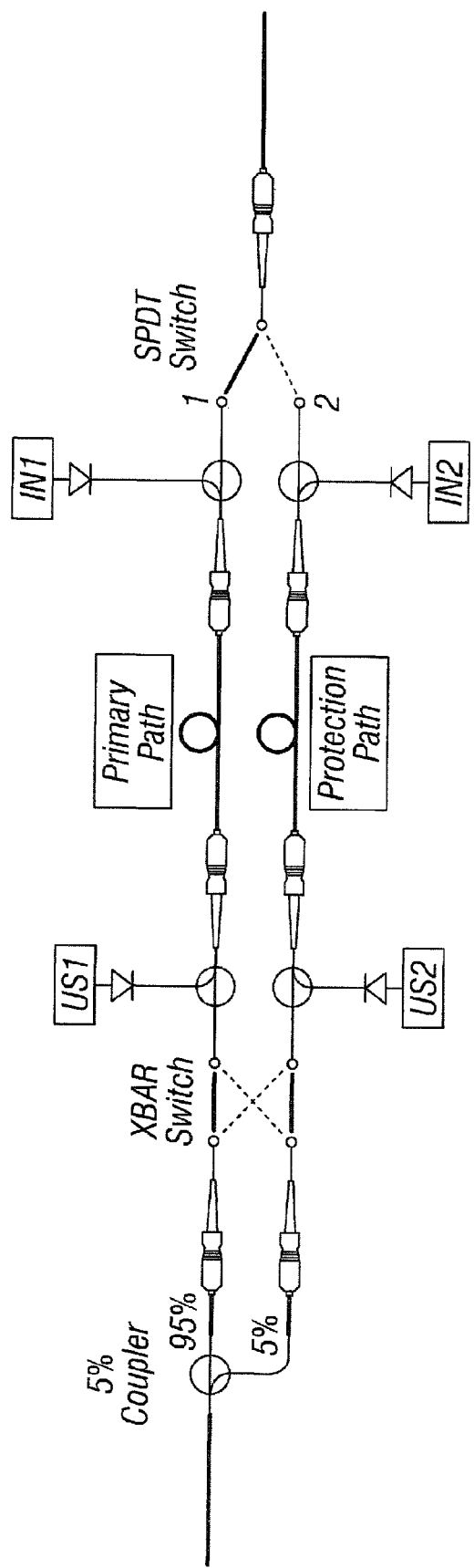
FIG. 3 illustrates a bi-directional path protection technique employing a primary and protection path, one cross-bar switch and one SPDT optical switch (appropriately labeled prior art).

A switch stability analysis shows that the technique of FIG. 3, while more stable than the technique shown in FIG. 2, is not stable under all circumstances as the following example illustrates. Let switch SW1 denote the cross-bar switch and switch SW2 denote the SPDT switch. Suppose that both the primary and backup fiber lengths are 200 km so that the fiber delay is 1 ms. This implies that if there is a fiber break right at SW1, it will take SW2 1 ms to see the loss of light while SW1 will see it immediately. Suppose that the switches have switching times Ts1=Ts2=5 ms. Assume that there is no waiting time so that a change of state that requires switching will initiate the switch. Suppose also that this is a bi-directional system, so that there is always light in both directions, and that there is no latching of switches so that, for example, SW2 reverts to A in case IN1=IN2=0. Analogously, SW1 reverts to BAR if CB1=CB2=0.

The logic tables for SW1 (the Xbar switch) is shown in the table below:

| US1 | US2 | Xbar Switch Status |
|---|---|---|
| 0 | 0 | BAR |
| 0 | 1 | CROSS |
| 1 | 0 | BAR |
| 1 | 1 | BAR |

The notation here is that US1=1 implies that light is detected (above some user-set threshold power) in the upstream photodiode in the primary path of the. Xbar switch, while US1=0 implies that the light falls below the user-defined threshold. Similarly, the notation US2=1 and US2=0 has the same meaning but for the upstream photodiode in the secondary path of the Xbar switch.

The logic tables for SW2 (the SPDT switch) is shown in the table below:

| IN1 | IN2 | SPDT Switch Status |
|---|---|---|
| 0 | 0 | 1 |
| 0 | 1 | 2 |
| 1 | 0 | 1 |
| 1 | 1 | 1 |

The notation is that IN1=1 implies that light is detected (above some user-set threshold power) in the down-stream photodiode in the primary path of the SPDT switch, while IN1=0 implies that the light falls below the user-defined threshold.

Similarly, the notation IN2=1 and IN2=0 has the same meaning but for the down-stream photodiode in the secondary path of the SPDT switch. The status of switch SW2 (third column of table above) is a '1' if the SPDT switch is switched to the primary path, and the status is a '0' if the SPDT switch is switched to the protection path.

Example of Switching Instability

As an example, suppose that the initial state of the switches is given by:
SW1=BAR (with US1=1, US2=0) and SW2=position 1 (with IN1=IN2=1).

Suppose that the switches have switching times Ts1=Ts2=5 ms. Assume that there is no waiting time so that a change of state that requires switching will initiate the switch immediately.

Figure 4:
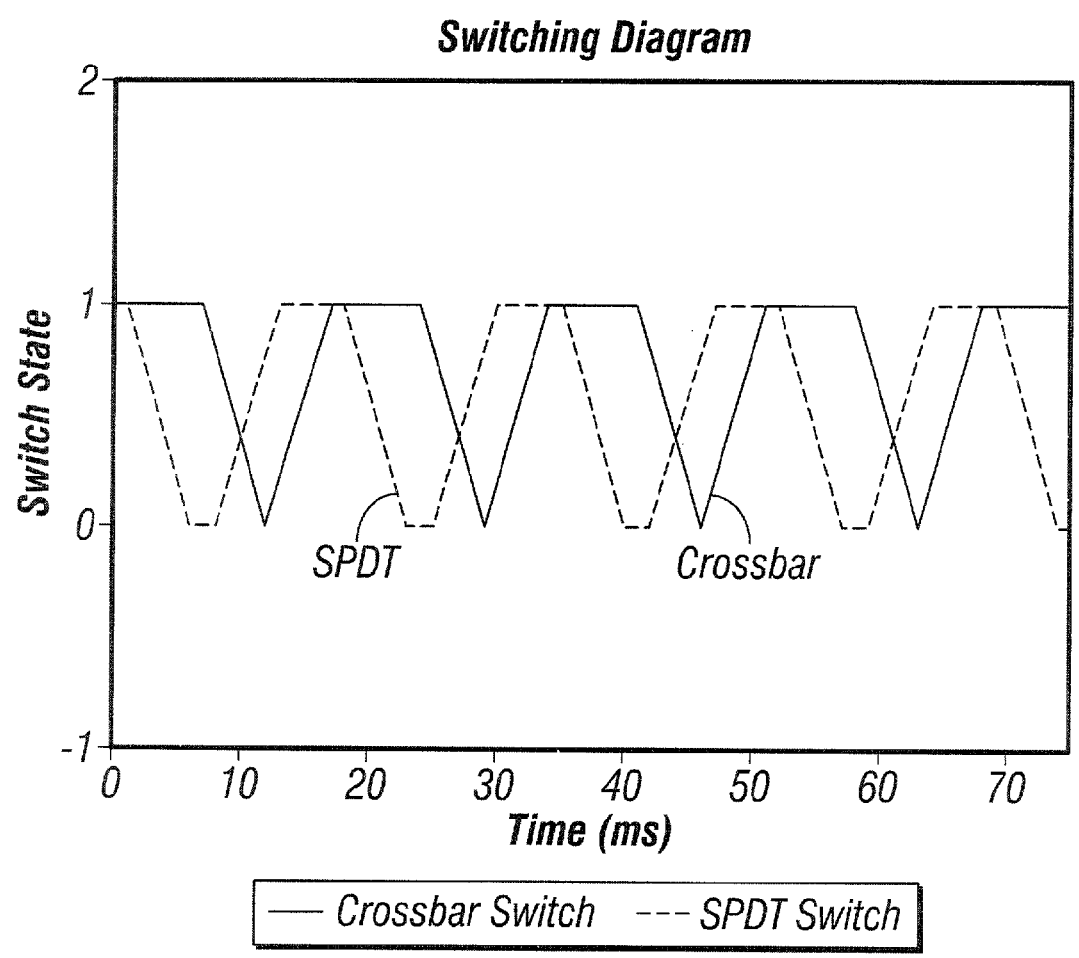
FIG. 4 illustrates a switching diagram for cross-bar and SPDT switches.

Now suppose there is a fiber break in the primary fiber at time t=0. As an example, suppose that the break is right next to SW1 (this is just for the purpose of having definite times for the switching events that follow). The state of the two switches is shown in FIG. 4 below (where a state of 1 represents a BAR state for the cross-bar switch and position 1 for the SPDT switch):

Note that there is instability, with both switches rapidly changing states for an indefinite length of time. This infinite toggling between switching states (called switch chatter) is not a low-probability event. Almost any combination of delay and switching times results in this infinite toggling between switching states. In reality, the toggling may not last infinitely long because switching times are not fixed (they have a certain probability distribution) and there are other delays (such as delays due to the sensor photodiodes but these are negligible compared to the ms time frames we're dealing with here) but the output will not be stable, and the switch chatter makes it likely that the switch is damaged or broken.

Description of Preferred Embodiments

Embodiments of this disclosure can include a new type of cross-bar switch, and an attendant switching logic, that makes the protection switching technique shown in FIG. 3 stable. Embodiments of this disclosure can combine stable switching under all initial conditions with a decrease of more than 2.5 dB in optical loss compared to the switching system shown in FIG. 1. Embodiments of this disclosure can include a new type of cross-bar switch (shaded area to the left of the fiber) that incorporates a third light sensor in the down-stream path (labeled DS1) that, for example along with a switch logic algorithm, results in stable protection switching and a simultaneously reduction in optical loss of more than 2.5 dB compared to the switching system shown in FIG. 1. Embodiments of this disclosure can include adding a third photodiode in the down-stream path (labeled DS1) of the cross-bar switch as shown in FIG. 5.

Figure 5:
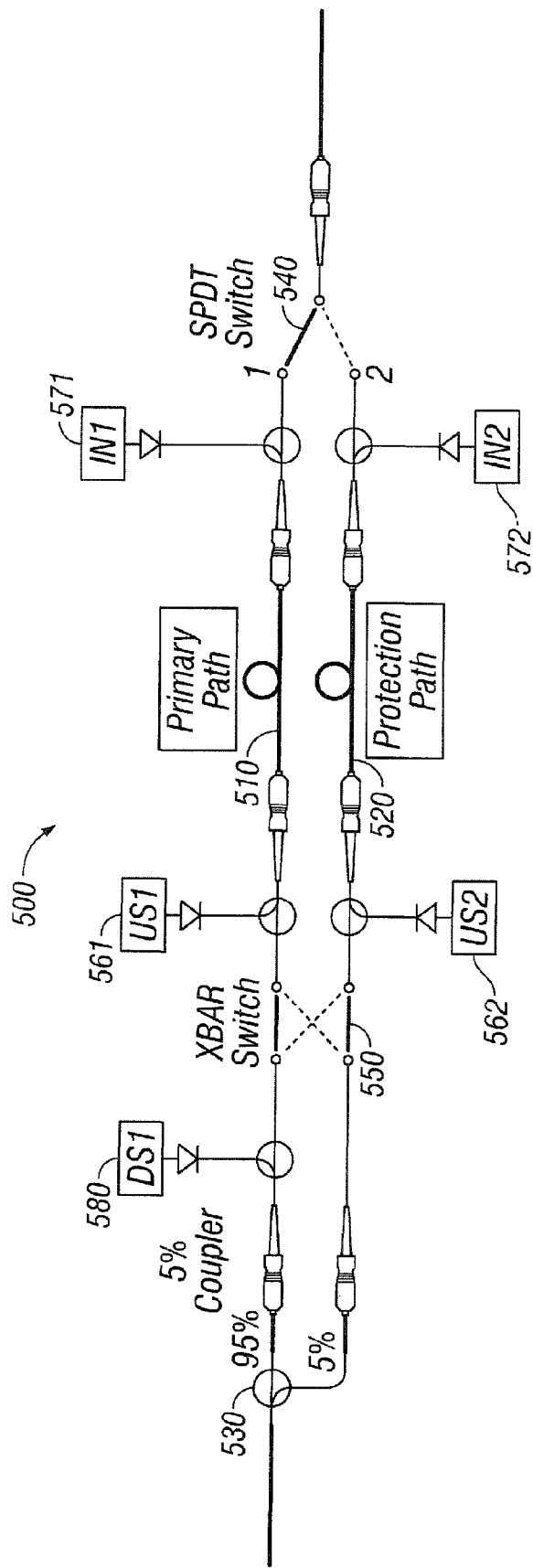
FIG. 5 illustrates a cross-bar switch that includes an additional optical photodiode in the down-stream path (labeled DS1) that in combination with hardware, firmware and/or software results in stable protection switching.

Referring to FIG. 5, a bidirectional optical fiber path 500 includes a primary optical fiber path 510. A secondary optical fiber path 520 is coupled to the primary optical fiber path. An optical coupler 530 is coupled to both the primary optical fiber path and the secondary optical fiber path. An optical switch 540 is coupled to both the primary optical fiber path and the secondary optical fiber path, the optical switch selecting a path of lower optical loses. An optical cross bar switch 550 is coupled to both the primary optical fiber path and the secondary optical fiber path and located between the optical coupler and the optical switch. A primary upstream light detector 561 coupled to the primary optical path between the optical cross bar switch and the optical switch. A secondary upstream light detector 562 is coupled to the secondary optical path between the optical cross bar switch and the optical switch. A primary downstream light detector 571 is coupled to the primary optical path between the optical cross bar switch and the optical switch. A secondary downstream light detector 572 is coupled to the secondary optical path between the optical cross bar switch and the optical switch. Another downstream light detector 580 is coupled to the primary optical fiber path between the optical coupler and the optical cross bar switch. The downstream light detector 580 is an important part of embodiments of this disclosure and provides commercially significant advantages including simultaneously stable protection switching and reduced optical loss.

Logic Table for Cross-Bar Switch

Since there are now three logical inputs to the Cross-Bar switch (namely the three photodiodes US1, US2 and DS1), there are eight input states for which the output state of the cross-bar switch must be defined. In embodiments of this disclosure, the logic table for the cross-bar switch can be given by:

| US1 | US2 | DS1 | Switch State |
|-----|-----|-----|--------------|
| 0 | 0 | 0 | BAR |
| 0 | 1 | 0 | BAR |
| 1 | 0 | 0 | BAR |
| 1 | 1 | 0 | BAR |
| 0 | 0 | 1 | BAR |
| 0 | 1 | 1 | CROSS |
| 1 | 0 | 1 | BAR |
| 1 | 1 | 1 | BAR |

From the Karnaugh Map for this logic table, the minimal Boolean expression (in standard sum of products format) is found to be:

Output=(US1)+(US2)'+(DS1)'

Since the labeling of the switch states is arbitrary, the complement of this is also acceptable:

Output=[(US1)+(US2)'+(DS1)']'=(US1')(US2)(DS1)

Logic Table for SPDT Switch
In embodiments of this disclosure, the logic table for the SPDT switch can be given by:

| IN1 | IN2 | SPDT Switch State |
|-----|-----|-------------------|
| 0 | 0 | 1 |
| 0 | 1 | 0 |
| 1 | 0 | 1 |
| 1 | 1 | 1 |

Here, an SPDT state of '1' implies that the switch is in the primary path position and an SPDT state of '0' implies that the switch is in the protection path position. A Karnaugh map of the above logic table for switch SW2 is shown below:

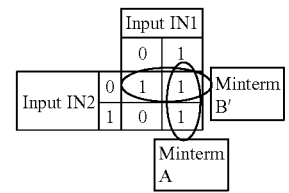

The minimum Boolean expression for the switch (in sum of product format) is:

Output=IN1+IN2'

Since the labeling of the switch states is arbitrary, the complement of this is also acceptable:

Output=[IN1+IN2']'=(IN1')(IN2)

Adding Switch Delays for Additional Stability
In addition to using a crossbar switch with an extra photodiode sensor, adding switching delays that satisfy certain numerical criteria improves the stability of the protection switching technique. A switching delay of $T_{del}$ implies that if the logic table for the switch indicating that a switching event has occurred, the switching algorithm will introduce a delay of $T_{del}$ before switching is actually initiated. The terms $T_{del1}$ and $T_{del2}$ will denote the switching delays introduced into the cross-bar switch and SPDT switch, respectively. The term $T_{SW}$ refers to the inherent switching time of both the cross-bar and the SPDT switch. Depending on the nature of the combined switches and their operational context $T_{SW}$ can be the longer of the two, the two added together, the two added together minus a temporal overlap, an average of the two or another constant.

One of the stability criteria is that the delay times of both switches should satisfy the condition that Tdel>2*Tsw. Another criterion is that the two delays should not be equal: Tdel1≠Tdel2.

Also, the delay time for the crossbar switch must be less than the delay time for the SPDT switch: Tdel1<Tdel2. These conditions can be summarized by the following stability condition:

$$T_{del2} > T_{del1} \geq 2*T_{sw}$$

Summary

Embodiments of this disclosure can include:
1) A cross-bar switch with two photodiodes for sensing upstream light in the primary and protection paths, and a third photodiode for sensing downstream light in either the primary or protection fiber paths.
2) A cross-bar switching logic that is described by the minimum Boolean expression:

Output=(US1)+(US2)'+(DS1)' or alternatively,

Output=[(US1)+(US2)'+(DS1)']'=(US1')(US2)(DS1)

3) An SPDT switching logic that is described by the minimum Boolean expression:

Output=IN1+IN2'

Since the labeling of the switch states is arbitrary, the complement of this is also acceptable:

Output=[IN1+IN2']'=IN1'IN2

4) The introduction of switching delays satisfying the condition:

$$T_{del2} > T_{del1} \geq 2*T_{sw}$$

In summary, embodiments of this disclosure can provide stable switching under all network conditions, without the need for communications between the switches, and moreover lowers optical losses by more than 2.5 dB compared to simpler protection switching schemes that use a combination of a 50/50 coupler and an SPDT switch.

Definitions

Figure 1:
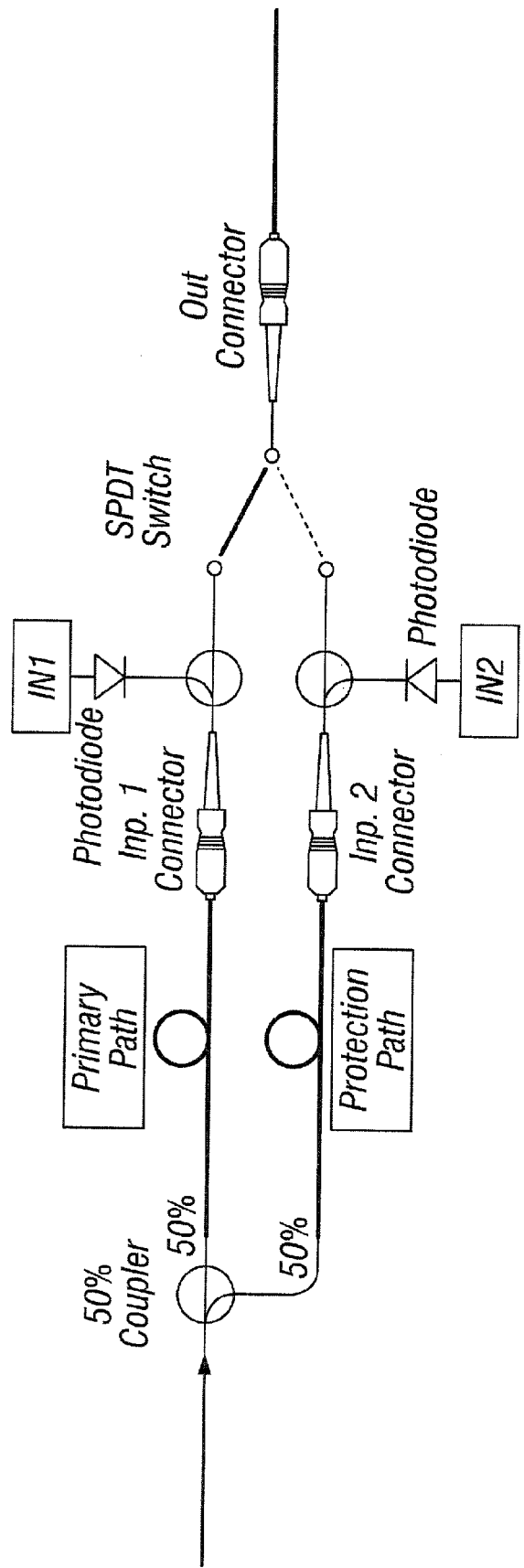
FIG. 1 illustrates traditional path protection employing a primary and protection path, a 50% optical coupler and a SPDT optical switch for selecting the best path (appropriately labeled prior art).

The term downstream is intended to mean the direction from a headend to customer premises equipment (CPE) (e.g. referring to FIGS. 1, 3 & 5, from left to right). The term upstream is intended to mean the direction from customer premises equipment to a headend (e.g. referring to FIGS. 1, 3 & 5, from right to left). The terms program and software and/or the phrases program elements, computer program and computer software are intended to mean a sequence of instructions designed for execution on a computer system (e.g., a program and/or computer program, may include a subroutine, a function, a procedure, an object method, an object implementation, an executable application, an applet, a servlet, a source code, an object code, a shared library/dynamic load library and/or other sequence of instructions designed for execution on a computer or computer system). The phrase radio frequency (RF) is intended to mean frequencies less than or equal to approximately 300 GHz as well as the infrared spectrum. The term light is intended to mean frequencies greater than or equal to approximately 300 GHz as well as the microwave spectrum.

The term uniformly is intended to mean unvarying or deviate very little from a given and/or expected value (e.g., within 10% of). The term substantially is intended to mean largely but not necessarily wholly that which is specified. The term approximately is intended to mean at least close to a given value (e.g., within 10% of). The term generally is intended to mean at least approaching a given state. The term coupled is intended to mean connected, although not necessarily directly, and not necessarily mechanically. The term proximate, as used herein, is intended to mean close, near adjacent and/or coincident; and includes spatial situations where specified functions and/or results (if any) can be carried out and/or achieved. The term distal, as used herein, is intended to mean far, away, spaced apart from and/or non-coincident, and includes spatial situation where specified functions and/or results (if any) can be carried out and/or achieved. The term deploying is intended to mean designing, building, shipping, installing and/or operating.

The terms first or one, and the phrases at least a first or at least one, are intended to mean the singular or the plural unless it is clear from the intrinsic text of this document that it is meant otherwise. The terms second or another, and the phrases at least a second or at least another, are intended to mean the singular or the plural unless it is clear from the intrinsic text of this document that it is meant otherwise. Unless expressly stated to the contrary in the intrinsic text of this document, the term or is intended to mean an inclusive or and not an exclusive or. Specifically, a condition A or B is satisfied by any one of the following: A is true (or present) and B is false (or not present), A is false (or not present) and B is true (or present), and both A and B are true (or present). The terms a and/or an are employed for grammatical style and merely for convenience.

The term plurality is intended to mean two or more than two. The term any is intended to mean all applicable members of a set or at least a subset of all applicable members of the set. The phrase any integer derivable therein is intended to mean an integer between the corresponding numbers recited in the specification. The phrase any range derivable therein is intended to mean any range within such corresponding numbers. The term means, when followed by the term "for" is intended to mean hardware, firmware and/or software for achieving a result. The term step, when followed by the term "for" is intended to mean a (sub)method, (sub)process and/or (sub)routine for achieving the recited result. Unless otherwise defined, all technical and scientific terms used herein have the same meaning as commonly understood by one of ordinary skill in the art to which this present disclosure belongs. In case of conflict, the present specification, including definitions, will control.

The described embodiments and examples are illustrative only and not intended to be limiting. Although embodiments of the present disclosure can be implemented separately, embodiments of the present disclosure may be integrated into the system(s) with which they are associated. All the embodiments of the present disclosure disclosed herein can be made and used without undue experimentation in light of the disclosure. Embodiments of the present disclosure are not limited by theoretical statements (if any) recited herein. The individual steps of embodiments of the present disclosure need not be performed in the disclosed manner, or combined in the disclosed sequences, but may be performed in any and all manner and/or combined in any and all sequences. The individual components of embodiments of the present disclosure need not be formed in the disclosed shapes, or combined in the disclosed configurations, but could be provided in any and all shapes, and/or combined in any and all configurations.

Various substitutions, modifications, additions and/or rearrangements of the features of embodiments of the present disclosure may be made without deviating from the scope of the underlying inventive concept. All the disclosed elements and features of each disclosed embodiment can be combined with, or substituted for, the disclosed elements and features of every other disclosed embodiment except where such elements or features are mutually exclusive. The scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" or "mechanism for" or "step for". Sub-generic embodiments of this disclosure are delineated by the appended independent claims and their equivalents. Specific embodiments of this disclosure are differentiated by the appended dependent claims and their equivalents.

What is claimed is:

1. An apparatus, comprising:
    a bidirectional optical fiber path including a primary optical fiber path;
    a secondary optical fiber path coupled to the primary optical fiber path;
    an optical coupler coupled to both the primary optical fiber path and the secondary optical fiber path;
    an optical switch coupled to both the primary optical fiber path and the secondary optical fiber path, the optical switch selecting a path of lower optical loses;
    an optical cross-bar switch coupled to both the primary optical fiber path and the secondary optical fiber path and located between the optical coupler and the optical switch;
    a primary upstream light detector coupled to the primary optical path between the optical cross bar switch and the optical switch;
    a secondary upstream light detector coupled to the secondary optical path between the optical cross bar switch and the optical switch;
    a primary downstream light detector coupled to the primary optical path between the optical cross bar switch and the optical switch;
    a secondary downstream light detector coupled to the secondary optical path between the optical cross bar switch and the optical switch; and
    a stabilizing downstream light detector coupled to the primary optical fiber path between the optical coupler and the optical cross bar switch,
    wherein the cross-bar switch is set to a cross output state when the primary upstream light detector does not detect light, the secondary upstream light detector detects light and the stabilizing downstream light detector detects light.

2. The apparatus of claim 1, wherein the optical switch is set to a secondary output state when the primary downstream light detector does not detect light and the secondary downstream light detector detects light.

3. The apparatus of claim 2, wherein the optical cross-bar switch is characterized by a delay $T_{del1}$ and the optical switch is characterized by a delay $T_{del2}$ and
    $T_{del2} > T_{del1} \geq 2*T_{sw}$ where $T_{sw}$ refers to the inherent delay of both the cross-bar and the optical switch.

4. The apparatus of claim 1, wherein the optical switch includes a single pole double throw switch and both the primary downstream light detector and the secondary downstream light detector are located proximate the single pole double throw switch.

5. A fiber optic network, comprising the apparatus of claim 1.

6. A method, comprising:
    protecting a bidirectional optical fiber path including operating a primary optical fiber path;
    a secondary optical fiber path coupled to the primary optical fiber path;
    an optical coupler coupled to both the primary optical fiber path and the secondary optical fiber path;
    an optical switch coupled to both the primary optical fiber path and the secondary optical fiber path, the optical switch selecting a path of lower optical loses;
    an optical cross-bar switch coupled to both the primary optical fiber path and the secondary optical fiber path and located between the optical coupler and the optical switch;
    a primary upstream light detector coupled to the primary optical path between the optical cross bar switch and the optical switch;
    a secondary upstream light detector coupled to the secondary optical path between the optical cross bar switch and the optical switch;
    a primary downstream light detector coupled to the primary optical path between the optical cross bar switch and the optical switch;
    a secondary downstream light detector coupled to the secondary optical path between the optical cross bar switch and the optical switch; and
    a stabilizing downstream light detector coupled to the primary optical fiber path between the optical coupler and the optical cross bar switch,
    further comprising setting the cross-bar switch to a cross output state when the primary upstream light detector does not detect light, the secondary upstream light detector detects light and the stabilizing downstream light detector detects light.

7. The method of claim 6, further comprising setting the optical switch to a secondary output state when the primary downstream light detector does not detect light and the secondary downstream light detector detects light.

8. The method of claim 7, wherein the optical cross-bar switch is characterized by a delay T.sub.del1 and the optical switch is characterized by a delay $T_{del2}$ and
    $T_{del2} > T_{del1} \geq 2*T_{sw}$ where $T_{sw}$ refers to the inherent delay of both the cross-bar and the optical switch.

* * * * *